(No Model.)

W. H. GRUBB.
VELOCIPEDE.

No. 248,737. Patented Oct. 25, 1881.

WITNESSES
O. T. Bates
Philip S. Mc Masi.

INVENTOR
W. H. Grubb,
by Anderson & Smith
his ATTORNEYS

UNITED STATES PATENT OFFICE.

WILLIAM H. GRUBB, OF HANNIBAL, MISSOURI.

VELOCIPEDE.

SPECIFICATION forming part of Letters Patent No. 248,737, dated October 25, 1881.

Application filed August 23, 1881. (No model.)

*To all whom it may concern:*

Be it known that I, WM. H. GRUBB, a citizen of the United States, a resident of Hannibal, in the county of Marion and State of Missouri, have invented a new and valuable Improvement in Velocipedes; and I do hereby declare that the following is a full, clear, and exact description of the construction and operation of the same, reference being had to the annexed drawings, making a part of this specification, and to letters and figures of reference marked thereon.

Figure 1:
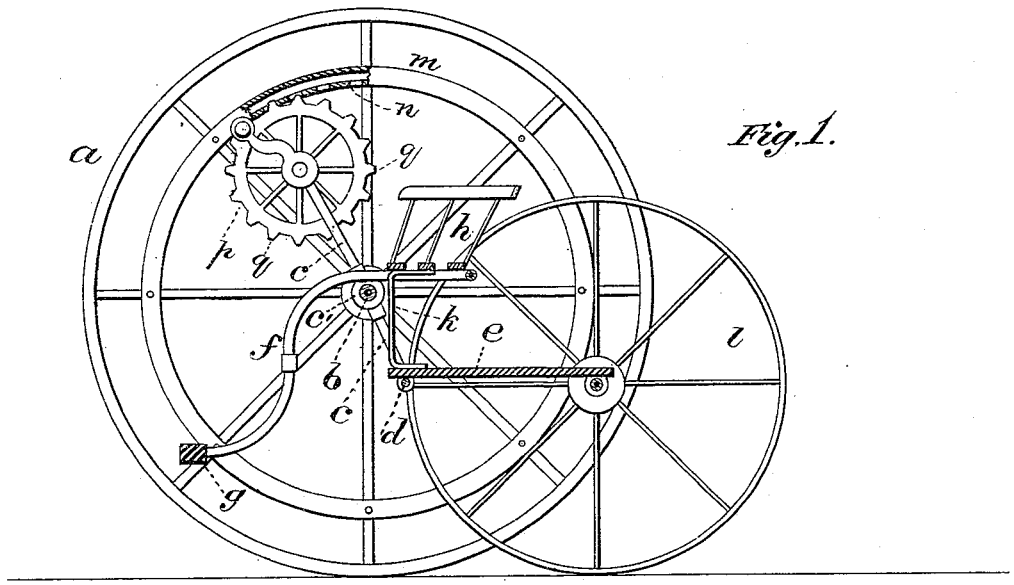
Figure 2:
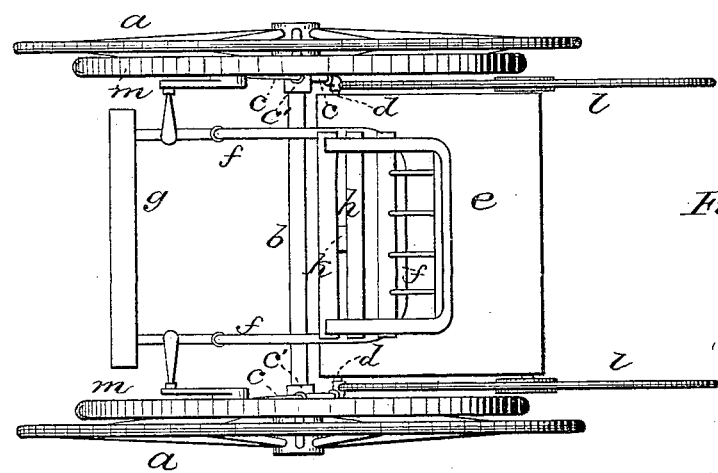

Figure 1 of the drawings is a representation of a side view of my invention, and Fig. 2 is a plan view of the same.

This invention relates to improvements in caroches; and it consists in the construction and novel arrangement hereinafter set forth.

In the annexed drawings the letters $a$ represent the forward or driving wheels of the caroche, which are made of gas-pipe, the rims, spokes, and hubs being constructed of pipe of different size. These wheels are sleeved upon an axle, $b$, also made of gas-pipe, the wheels and axle turning together. The axle passes loosely through collars $c'$, which are secured to vertical arms $c$ extending above and below the axle. Below the axle the arms $c$ are connected by a cross-tube, $d$, which supports the front of the seat-platform $e$.

Secured at the middle of the tube $d$ is a tube, $f$, which supports at its lower end the foot-rest $g$, and where it extends back of the axle also supports the seat $h$, the latter being also supported by a spring, $k$, which bears on the platform $e$. This platform is supported at the rear by wheels $l$, which are smaller than wheels $a$, but of similar construction.

Secured to the inner faces of wheels $a$ are the circular pipe-racks $m$, having the recesses $n$ on the inside.

Journaled in the tops of the arms $c$ are sprocket-wheels $p$, which are arranged in the planes of the rack-wheel $m$, so that the teeth $q$ will engage the recesses of the racks as the sprockets are turned, whereby the velocipede is propelled.

With the exception of the seat and platform the whole device is constructed of gas-tubing, so that an exceedingly light and strong vehicle is produced.

The driving-gear herein described can be applied to row-boats, skiffs, &c.

I am aware that a wagon has been constructed with various parts made of tubing, and that a road-engine has been provided with a rack upon its wheels engaging a sprocket-wheel. I therefore lay no claim, broadly, to such devices; but

What I claim, and desire to secure by Letters Patent, is—

As an improvement in vehicles, a caroche composed of the following parts essentially, to wit: wheels $l$ and $a$, the latter provided with racks $m$, the sprocket-wheels $p$, axle $b$, arms $c$, cross-tube $d$, and supports $f$, all of which are made of tubing, and the foot-rest $g$, platform $e$, and seat $h$, whereby is formed a light and simple device adapted for hand propulsion, as set forth.

In testimony that I claim the above I have hereunto subscribed my name in the presence of two witnesses.

WILLIAM HARRISON GRUBB.

Witnesses:
  LLEWELLYN A. BOSWELL,
  CHARLES P. HEYWOOD.